(12) United States Patent
Simard et al.

(10) Patent No.: US 8,676,806 B2
(45) Date of Patent: Mar. 18, 2014

(54) INTELLIGENT AND PAPERLESS OFFICE

(75) Inventors: Patrice Y. Simard, Bellevue, WA (US);
Lewis C. Levin, Seattle, WA (US);
Christopher H. Prately, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 996 days.

(21) Appl. No.: 11/933,544

(22) Filed: Nov. 1, 2007

(65) Prior Publication Data
US 2009/0119324 A1 May 7, 2009

(51) Int. Cl.
*G06F 17/30* (2006.01)
(52) U.S. Cl.
USPC ............ 707/741; 707/805; 715/255; 235/375
(58) Field of Classification Search
None
See application file for complete search history.

(56) References Cited

U.S. PATENT DOCUMENTS

| | | | |
|---|---|---|---|
| 6,219,668 | B1 | 4/2001 | Arnaud et al. |
| 6,928,425 | B2 | 8/2005 | Grefenstette et al. |
| 6,983,287 | B1 * | 1/2006 | Jayanti et al. ................... 1/1 |
| 7,039,856 | B2 | 5/2006 | Peairs et al. |
| 7,149,347 | B1 | 12/2006 | Wnek |
| 7,296,223 | B2 | 11/2007 | Chidlovskii et al. |
| 2003/0050927 | A1 * | 3/2003 | Hussam ............................ 707/5 |
| 2003/0204461 | A1 | 10/2003 | Magary et al. |
| 2004/0205448 | A1 * | 10/2004 | Grefenstette et al. ......... 715/500 |
| 2005/0081139 | A1 * | 4/2005 | Witwer et al. .............. 715/501.1 |
| 2006/0161635 | A1 * | 7/2006 | Lamkin et al. ................ 709/217 |
| 2007/0053513 | A1 * | 3/2007 | Hoffberg ....................... 380/201 |
| 2007/0116358 | A1 | 5/2007 | Klotz et al. |
| 2007/0145138 | A1 | 6/2007 | Snyder et al. |
| 2007/0255728 | A1 | 11/2007 | Abate et al. |

OTHER PUBLICATIONS

Christian Duda. UBBInfo Search: A First Step towards the Paperless Office http://193.226.6.174/roedunet2003/site/conference/papers/DUDA_C-UBBInfo_Search_A_First_Step_towards_the_Paperless_O..pdf. Last accessed Dec. 21, 2007, 6 pages.
Scott A. Golder. The Structure of Collaborative Tagging Systems http://www3.isrl.uiuc.edu/~junwang4/langev/localcopy/pdf/golder05taggingSystems.pdf. Last accessed Dec. 21, 2007, 8 pages.
Andrew N. K. Chen, et al. An XML Adoption Framework for Electronic Business, Journal of Electronic Commerce Research, vol. 4, No. 1, 2003 http://www.csulb.edu/web/journals/jecr/issues/20031/paper1.pdf. Last accessed Dec. 21, 2007, 14 pages.

* cited by examiner

*Primary Examiner* — Shyue Jiunn Hwa
(74) *Attorney, Agent, or Firm* — Holly Nguyen; Carole Boelitz; Micky Minhas

(57) ABSTRACT

The claimed subject matter provides a system and/or a method that facilitates collecting and organizing electronic documents. An interface component can receive a document. A manager component can automatically file the document into a category based at least in part upon a portion of static metadata associated with the document and a portion of metadata dynamically generated from an inference related to the portion of static metadata associated with the document.

16 Claims, 10 Drawing Sheets

INTELLIGENT AND PAPERLESS OFFICE

BACKGROUND

Technological advances in computer hardware, software and networking have lead to increased demand for electronic information exchange rather than through conventional techniques such as paper and telephone correspondence, for example. Such electronic communication can provide split-second, reliable data transfer between essentially any two locations throughout the world. Many industries and consumers are leveraging such technology to improve efficiency and decrease cost through web-based (e.g., on-line) services. For example, consumers can purchase goods, review bank statements, research products and companies, obtain real-time stock quotes, download brochures, etc. with the click of a mouse and at the convenience of home.

As the amount of available electronic data grows, it becomes more important to store and/or utilize such data in a manageable manner that facilitates user-friendly and quick data searches and retrieval. Generally, various companies, enterprises, businesses, and the like include a tremendous amount of data, metadata, etc. For example, office productivity tools (e.g., word processing, spread sheets, presentation software, mail applications, contact applications, networks, instant messaging applications, etc.) can include a wealth of information about the user itself as well as a user's contact lists and/or interaction with contacts.

In general, companies, businesses, and enterprises can employ vast numbers of internal and/or external communications and information transfer. For example, internal and/or external communications and information transfer can include, but are not limited to electronic mail (email), fax, mail, handwritten notes, whiteboards, Internet Protocol (IP) telephony, web mail, web-browsing, text messaging over a network of two or more computers (or network connectable, processor-based devices), and the like. Such communications, whether internal, external, or both, can further generate an overwhelming amount of physical paper. The use of physical paper has been noted to contribute to the declination of the environment since large amounts of trees are lumbered for paper creation. In addition to its ill affects towards the environment, physical paper can be costly, unorganized, inefficient, and space-consuming.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate implementing a paperless environment with automatic document filing. A manager component can detect a document within an office environment and automatically file or store the document based on at least in part upon a portion of static metadata associated with the document and a portion of metadata dynamically generated from an inference related to the portion of static metadata and/or content or context associated with the document. In general, the document can be evaluated in which a tag can be appended to the document for identification or description. Moreover, the manager component can evaluate static metadata in order to infer and create additional metadata (e.g., dynamically generated metadata based on the static metadata and/or the content of the document), wherein at least one of the static metadata or the generated metadata can be utilized to automatically file the document. The manager component can further file or store the document utilizing the tag (e.g., including the any suitable combination of static metadata, generated metadata, etc.), wherein a collection of documents with substantially similar tags can be organized into a virtual file stack. The manager component can evaluate a plurality of documents, regardless of format, in order to identify a topic, category, content, context, subject, etc. in which to appropriately sort or file such document. Thus, the manager component drastically improves efficiency with the reduction (and possible elimination) of physical paper. In addition, the manager component can further provide automatic notification to an entity to which the document relates based on the evaluated content, context, and/or purpose of the document.

Upon the detection of a document, the manager component can generate a document-descriptive tag that can be utilized to sort and file the document automatically. Generally, the document can be any suitable document (independent of format) related to an office environment or network such as an attachment, an email, a word processor document, a presentation document, a scanned document, a fax, a spreadsheet, a drawing, a figure, a graphic, a portion of audio, a portion of text, a portion of a graphic, a portion of video, a portable document format (PDF), etc. Furthermore, the manager component can utilize a uniform component that implements a standardized convention in relation with file names, storage locations, document format, document file types, and the like. In another aspect in accordance with the subject innovation, an adviser component can generate suggestive data in connection with file locations, virtual file stack references, file names, and the like. In other aspects of the claimed subject matter, methods are provided that facilitate automatically detecting and filing a portion of incoming data based on content.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
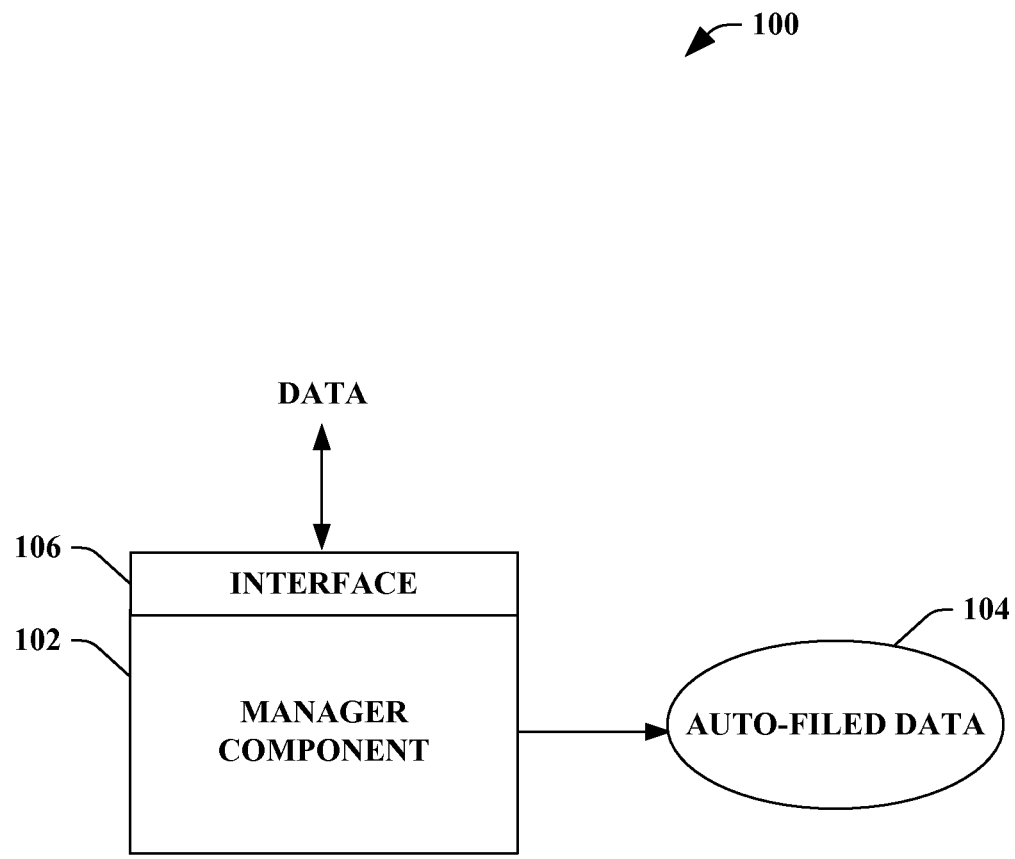
FIG. 1 illustrates a block diagram of an exemplary system that facilitates implementing a paperless environment with automatic document filing.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "network," "store," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates implementing a paperless environment with automatic document filing. The system 100 can include a manager component 102 that can automatically sort and/or file a portion of data received via the interface component 106 to result in auto-filed data 104. In general, the manager component 102 can evaluate the portion of data in order to identify a category or a location in which to store and/or file. For example, the portion of data (e.g., a document, etc.) can be stored in a structure, a data store, a hard drive, a network drive, and/or any suitable data storage device or system. In a specific example, the manager component 102 can evaluate the portion of data and tag such portion of data with category-specific or location-specific data, wherein such tag can be utilized for filing and/or storing such data and/or future data. In general, the manager component 102 can examine a portion of static metadata related to a document (e.g., a portion of data) and infer and generate additional metadata based on the portion of static metadata and/or the content of the document. By utilizing at least one of the static metadata, the generated metadata, the content of the document, the context of the document, or any suitable combination thereof, the manager component can automatically tag and file the document (e.g., portion of data). Moreover, the manager component 102 can inspect at least one of content or context of a document in order to sort and file such documents. For organization, the system 100 can tag the document with metadata that describes the document to enable efficient and track-able filing. In another aspect in accordance with the subject innovation, the document can be filed into categories or locations based on the tag to create virtual file (e.g., data, etc.) stacks. Thus, rather than having mounds of physical paper stacks, the subject innovation can create virtual file stacks based on evaluated and identified categories.

It is to be appreciated the portion of data can be a document associated with an office environment. For example, the document can be any suitable electronic document (regardless of format or file type) such as, but is not limited to, an attachment, an email, a word processor document, a presentation document, a scanned document, a fax, a spreadsheet, a drawing, a figure, a graphic, a portion of audio, a portion of text, a portion of a graphic, a portion of video, a portable document format (PDF), etc. In general, it is to be appreciated that the system 100 can be utilized with any suitable electronic data that can be included on physical paper. It is to be appreciated that the system 100 can automatically file or sort a plurality of documents based on their respective content or substance rather than file type or format. Thus, the claimed subject matter allows an office environment to reduce and/or eliminate the use of physical paper by automatically filing and/or storing electronic portions of data (e.g., documents, attachments, etc.).

For example, an office environment can include numerous incoming or outgoing documents (e.g., portions of data) that can be extremely difficult to track, store, and/or organize. A first document can relate to Client A and billing (e.g., substance, content, context, etc.), wherein such document can be automatically filed and/or stored based on such gathered information. A virtual file stack can be created with a reference tag of Client A and billing to allow such document to be efficiently accessed. A second document can be identified and evaluated to ascertain content associated with Client B. A virtual file stack can be generated for Client B in which the second document can be tagged and filed accordingly. A third document can be received that relates to Client A and billing which can then be stored and/or filed into the virtual file stack. By creating virtual file stacks based on the identified content or context, the documents can be efficiently stored/filed and managed without using physical paper.

As previously discussed, the manager component 102 can evaluate static metadata related to a document, wherein the static metadata can be, but is not limited to being, date, author, origin, source, device source, location, title, name of author, type of document, physical origin, language of the document, size of document, information within the document, name of the file, amount of reviewers of the document, amount of authors, amount of people that contributed, order of modification of the document, and/or any other suitable data statically related to the document. Utilizing such static metadata, the manager component 102 can infer and generate additional metadata in order to identify a content, a context, a purpose, a detail of the document, etc. For instance, by inferring, generating, and tagging the document with additional metadata, the document type, context, purpose, or content can be identified. For instance, by evaluating the static metadata of the document such as title, authors, language, format, etc., the manager component 102 can determine the document is a resume, a recipe, a time sheet, a bill, a check, a pay stub, etc.

It is to be appreciated that the manager component 102 can dynamically generate metadata based upon at least one of the static metadata associated with the document and/or a content related to the document. In one example, a document type/purpose and/or department affiliation can be determined by inferring information from static metadata such as identifying author and/or reviewer affiliation. Dynamically generated metadata can add more information by evaluating the content of a document. For instance, the manager component 102 can employ machine learning techniques to identify characteristics that a secretary and/or admin can gather by viewing the document (e.g., looking at a document and adding extra database fields, etc.). In another example, a resume can be the document, in which the manager component 102 can extract degree, years of experience, expertise, awards, spoken languages, references, etc. by evaluating static metadata, content, and the like. In another example, a purchase order can be the document, wherein the manager component 102 can identify such document as a purchase order by evaluating static metadata, content, etc. such as, product information, critical updates, departments, etc. Where the document is a specification, the manager component 102 can infer key players, dependencies, parts, etc.

In accordance with another aspect of the subject innovation, the manager component 102 can provide automatic notification to an entity. For example, based on the identified content (e.g., examining static metadata, generating additional metadata based on content and/or static metadata), the manager component 102 can notify an entity (e.g., department, manager, user, worker, group of people, an email alias, a machine, a voicemail, an email, an instant messenger address, a server, a network, etc.) based on the document being relevant to such entity. For example, the manager component 102 can identify the document as being a resume and notify a human resource department of such document.

In addition, the system 100 can include any suitable and/or necessary interface component 106 (herein referred to as "interface 106"), which provides various adapters, connectors, channels, communication paths, etc. to integrate the manager component 102 into virtually any operating and/or database system(s) and/or with one another. In addition, the interface 106 can provide various adapters, connectors, channels, communication paths, etc., that provide for interaction with the manager component 102, the auto-filed data 104, a portion of data associated with an office environment, and any other device and/or component associated with the system 100.

Figure 2:
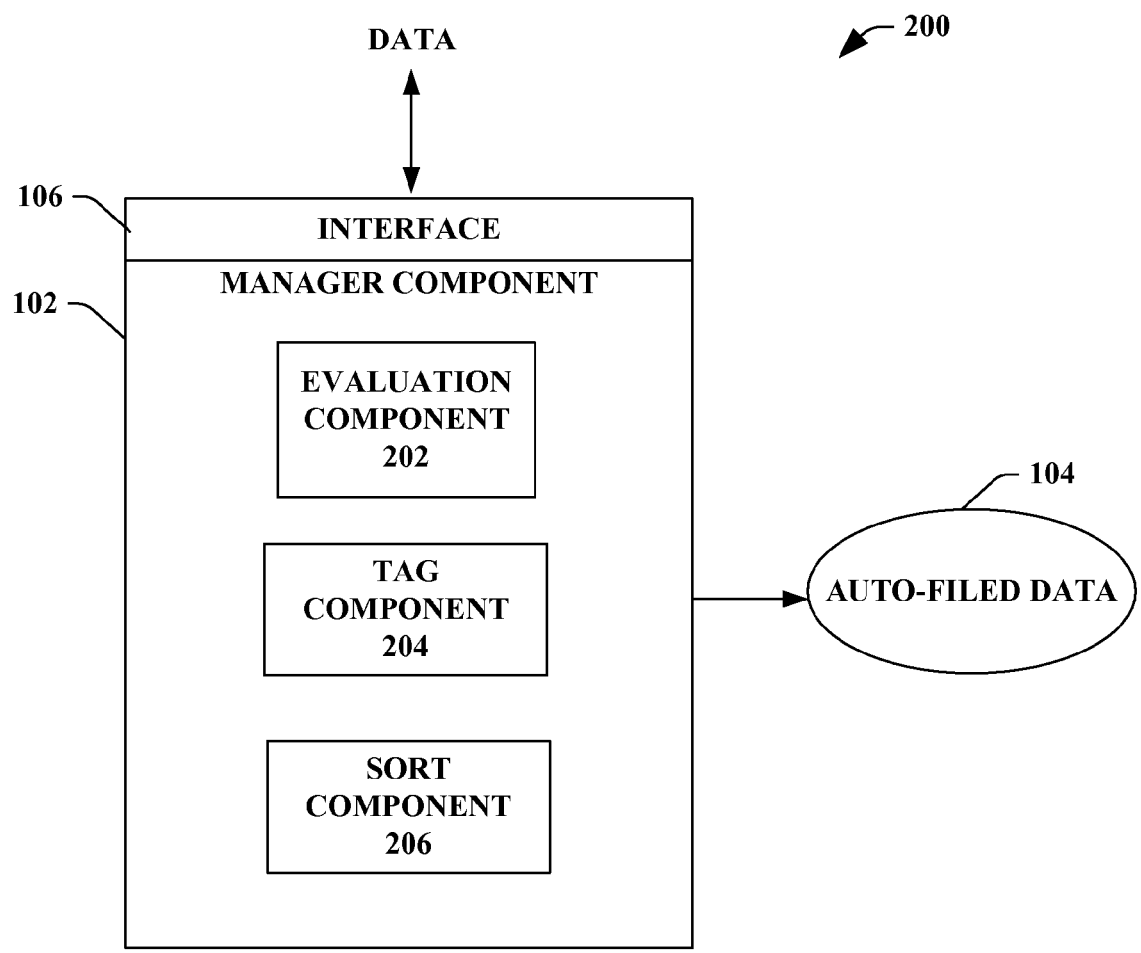
FIG. 2 illustrates a block diagram of an exemplary system that facilitates automatically detecting and filing a portion of incoming data based on content.

FIG. 2 illustrates a system 200 that facilitates automatically detecting and filing a portion of incoming data based on content. The system 200 can include the manager component 102 that can dynamically file and/or store a portion of data related to a document into a structure which enables the generation of auto-filed data 104. The manager component 102 can receive and/or identify a portion of data to incorporate (e.g., file, store, sort, etc.) into a structure, wherein such structure can be dynamically created, user-defined, pre-existing, etc. For instance, the system 200 can be employed in an office environment (e.g., a business, a company, a corporation, a partnership, a small business, an entity, a home office, etc.) in which data can be automatically filed based on content or context into an existing data structure (e.g., a network, a hard drive, a file storage system, a file folder directory structure, a file hierarchy, a schema, a data structure, etc.). In another example, the manager component 102 can dynamically create the structure as data is received and evaluated (e.g., dynamically, in real time, etc.). In still another example, the manager component 102 can incorporate a user preference and/or suggestion as the structure is dynamically created (e.g., prompts, pop-ups, user-defined settings, etc.). It is to be appreciated that the system 200 can utilize any suitable structure in connection with automatically filing and/or storing data.

The manager component 102 can include an evaluation component 202 that can examine a portion of received and/or identified data in order to ascertain content or context of such data. The evaluation component 202 can identify content or context of the office environment data in order to accurately stack, sort, and/or file the data. The evaluation component 202 can examine at least one of a source that transmitted the document, a target (e.g., the receiver or intended recipient, etc.) of the document, a substance of the document, metadata related to the document, properties of the document, received file type, received file name, a title of the document, and/or any other suitable data associated with the document. In addition, the evaluation component 202 can examine at least one of a portion of static metadata related to a document or a portion of automatically generated metadata (e.g., generated based on evaluating the static metadata, etc.). Moreover, the evaluation component 202 can utilize various conversion techniques in order to convert the data into suitable data format for evaluation. For instance, the data conversion technique can be, but not limited to being, text translation, scanned document conversion (e.g., text conversion, image conversion, etc.), image conversion, audio conversion, video translation, etc. For example, the document can be received as an audio file (e.g., which could be transcribed and stored on paper) that can be converted into text and evaluated for automatic filing/storing. In another example, a document can be scanned in which the evaluation component 202 can convert the scanned document into text or images to base the automatic filing.

The manager component 102 can further include a tag component 204 that can append the document or the portion of data with a tag for identification. The tag component 204 can generate a tag that describes the data based on at least one of a portion of content, the portion of static metadata, or the portion of generated metadata, wherein the content, context, purpose, or "gist" can be determined by the evaluation component 202. For instance, the tag can be metadata, a hypertext markup language (HTML) tag, a keyword, a portion of static metadata, a portion of generated metadata, and/or any suitable combination thereof. In general, the tag component 204 can employ any suitable tag that describes and/or identifies a document. A sort component 206 can file and store the document based on the tag appended thereto by the tag component 204. The sort component 206 can examine a tagged portion of data and file such document into a structure (e.g., a schema, a data structure, a file structure, a file folder directory, etc.).

Figure 3:
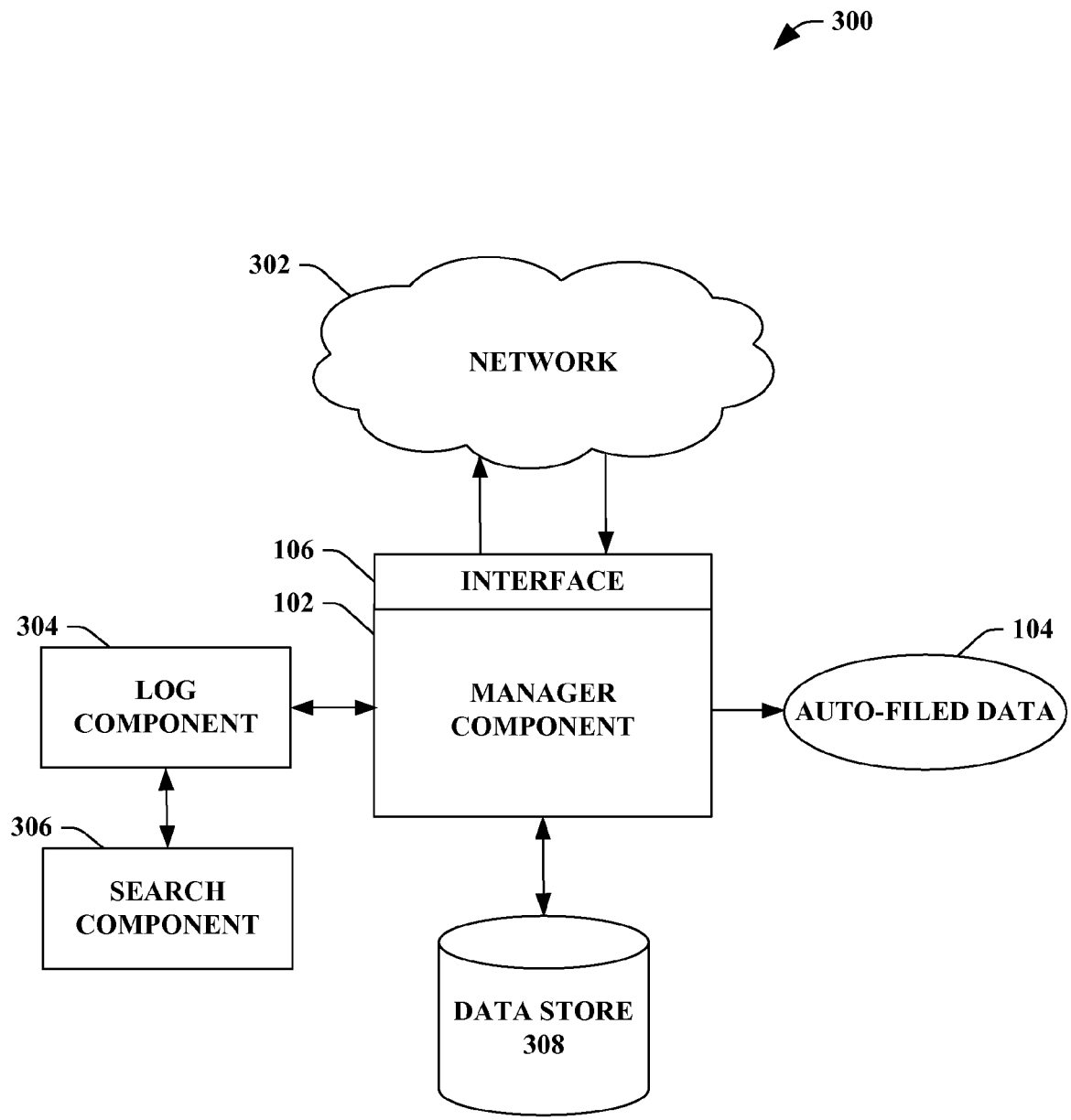
FIG. 3 illustrates a block diagram of an exemplary system that facilitates tracking automatic filing and storing of documents.

FIG. 3 illustrates a system 300 that facilitates tracking automatic filing and storing of documents. The system 300 can include the manager component 102 that can employ document evaluation and tagging for a paperless office environment with automatic filing and storage of data. In particular, the manager component 102 can receive a portion of data via the interface 106 and append an identifying tag to the portion of data, wherein such data can be filed and/or stored based on the tag. The portion of data can be stored and/or filed in accordance with a structure (e.g., pre-defined, dynamically created, etc.). Moreover, the manager component 102 can detect a portion of data within an office environment that can be automatically filed and/or stored. For instance, a first email attachment can be received and automatically filed. When a second email is received with the same attachment, the manager component 102 can ascertain that such document has been automatically stored and/or filed previously. In a similar example, the same attachment can be received via a scanning copy machine, in which the manager component 102 can ascertain that such document has been previously stored and/or filed. In yet another example, the attachment can be received in a disparate format or file type but with the same content, wherein the manager component 102 can ascertain that such content has been previously stored and/or filed from the first email attachment. Thus, the system 300 allows an office environment to be less redundant and wasteful by eliminating physical paper.

The manager component 102 can receive a portion of data such as, but not limited to, an electronic document, an attachment, an email, a word processing document, a portion of an image, a portion of audio, a portion of video, a scanned document, etc. The portion of data can be associated with a network 302, wherein the network 302 can be related to an office environment. For example, the manager component 102 can dynamically detect a document within the network 302 in which such document can be automatically filed and stored based upon content or context of such document. It is to be appreciated that the manager component 102 can dynamically file and store the document within the network 302, in a separate data store (as depicted and discussed below), and/or any suitable combination thereof. Moreover, it is to be appreciated and understood that the network 302 can include a structure (e.g., file structure, schema, a data structure, a file folder hierarchical storage system, etc.) associated with the office environment in which the data (e.g., a document) can be automatically filed and stored in accordance with.

The manager component 102 can utilize a log component 304 that can track various data related to the system 300. In particular, the log component 304 can track and/or monitor data related to the network 302, documents, attachments, locations, categories, tags, automatic filing details (e.g., time, location, content, context, etc.), automatic storing details (e.g., time, location, location in structure, etc.), static metadata, generated metadata created by evaluating the static metadata (e.g., utilizing inference techniques, etc.), etc. It is to be appreciated that the log component 304 can be a stand-alone component, incorporated into the manager component 102, incorporated into the network 302, and/or any combination thereof.

The manager component 102 can further utilize a search component 306 that facilitates querying any data associated with the system 300. The search component 306 can allow a user and/or any component to query to system 300 in relation to data automatically filed or stored, tags associated with the automatic filing or storing, location of data, categories utilized for filing or storing, structure in which data is stored or filed, static metadata, generated metadata, etc. For example, a user can query the system 300 to identify a particular document that had been automatically filed in the past. In another example, the system 300 can be queried to identify categories that have been created to which data is being filed and/or stored. In still another example, the system 300 can be queried to locate a specific virtual file stack. It is to be appreciated that a plurality of searches and/or queries can be implemented by the search component 306 and the above examples are not to be limiting on the claimed subject matter. Moreover, it is to be appreciated that the search component 306 is depicted as a stand-alone component, but the search component 306 can be incorporated into the manager component 102, the network 302, and/or any combination thereof.

The system 300 can further include a data store 308 that can include any suitable data related to the manager component 102, the network 302, the auto-filed data 104, the log component 304, the search component 306, etc. For example, the data store 308 can include, but not limited to including, data related to the network 302, documents, email, email attachments, tags, a structure for data to be stored or file (e.g., a file storage system, a file folder directory, a hierarchy of data stores, an organization of data containers based on an office environment, etc.), tagging settings, filing settings/options, storing options/settings, naming conventions (discussed in more detail below), tagging criteria, logged data, historic data related to searches, historic data related to automatically filed or stored data, conversion techniques, static metadata, generated metadata, inference techniques, and/or any other suitable data related to automatically filing or storing a portion of data associated with the network 302.

It is to be appreciated that the data store 308 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 308 of the subject systems and methods is intended to comprise, without being limited to, these and any other suitable types of memory. In addition, it is to be appreciated that the data store 308 can be a server, a database, a hard drive, a pen drive, an external hard drive, a portable hard drive, and the like.

Figure 4:
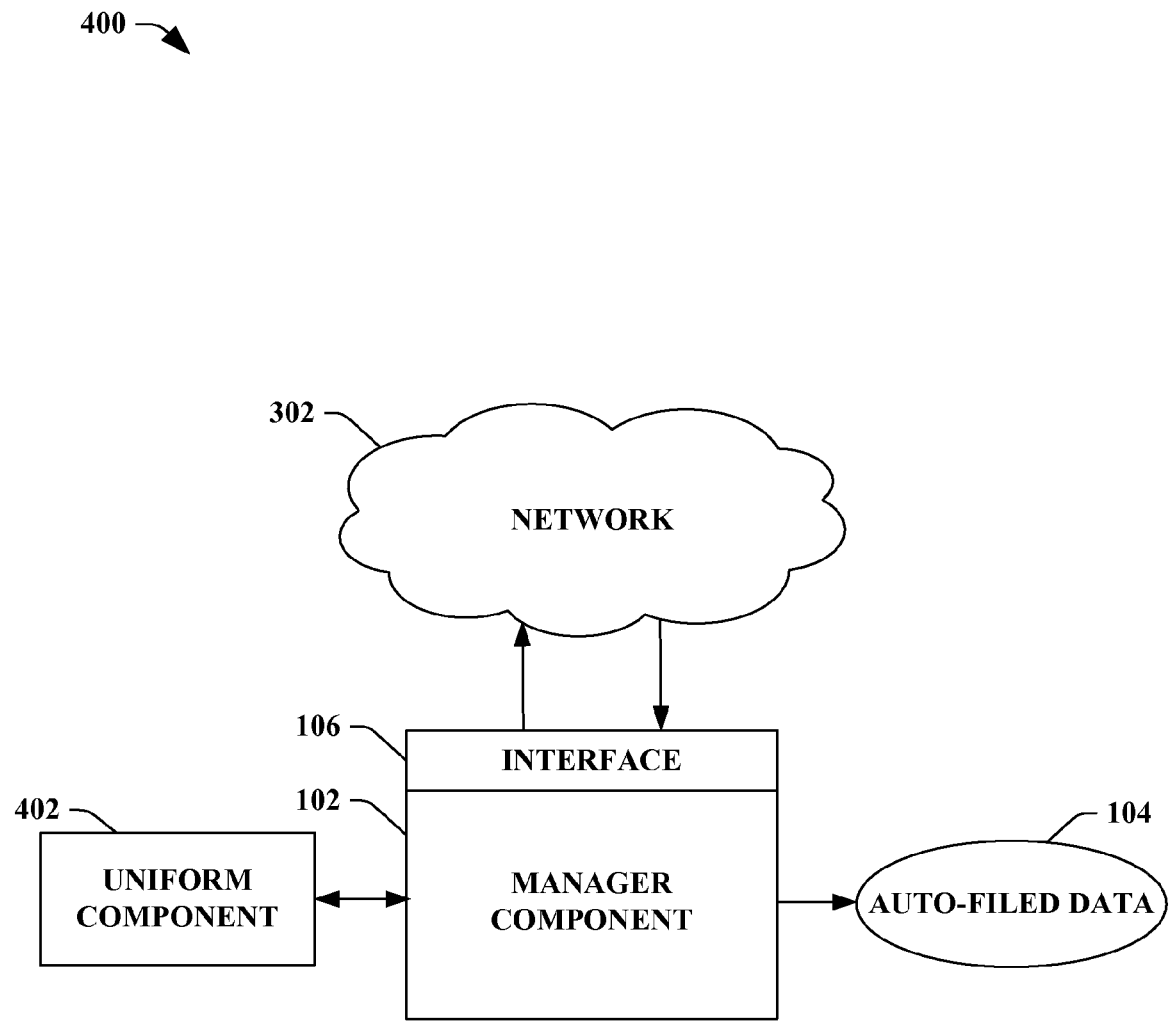
FIG. 4 illustrates a block diagram of an exemplary system that facilitates employing uniformity to a portion of automatically filed data within a network.

FIG. 4 illustrates a system 400 that facilitates employing uniformity to a portion of automatically filed data within a network. The system 400 can include the manager component 102 that can receive a document related to a network 302, wherein the document can be evaluated and tagged with context, type, purpose, or content identifying metadata for automatic filing and/or storing. For instance, an incoming email with a word processing document attachment can be automatically detected, evaluated, tagged, and sorted into a location or category within a structure. The static metadata can be evaluated by the manager component 102 in order to create additional metadata that further identifies the document. For instance, a first portion of metadata, a second portion of metadata, and a third portion of metadata can be evaluated to infer that the document relates to a slide show presentation. Typically, the attachment would be manually evaluated, printed, and physically filed. The system 400 enables the attachment to be automatically filed and/or stored in a virtual file stack based on identified content, type, purpose, and/or context of the attachment. Thus, the system 400 drastically reduces or eliminates the amount of physical paper utilized within the network 302.

The manager component 102 can utilize a uniform component 402 that employs a standardized convention in connection with at least one of a file name, a virtual file stack name, file type, or a name related to a structure into which items/data can be filed or stored. In particular, the uniform component 402 can ensure data automatically filed and/or stored is consistent in terms of naming conventions (e.g., file name, file location name, virtual file stack name, etc.). The uniform component 402 can enforce a standardized naming convention based on user-defined criteria, pre-established criteria utilized within the network 302, dynamically identified criteria based on incoming documents that are automatically filed/stored, and/or any other suitable combination thereof.

For instance, an office environment can include a network drive (e.g., shared hard drive, etc.) that is accessible to employees and hosts data related to the office. The network drive can include a naming convention for documents in connection with any data stored thereon. The uniform component 402 can employ such existing naming conventions with incoming data that is automatically filed and/or stored. Moreover, it is to be appreciated that the uniform component 402 can initiate a user-defined naming convention in order to update the existing naming convention.

Figure 5:
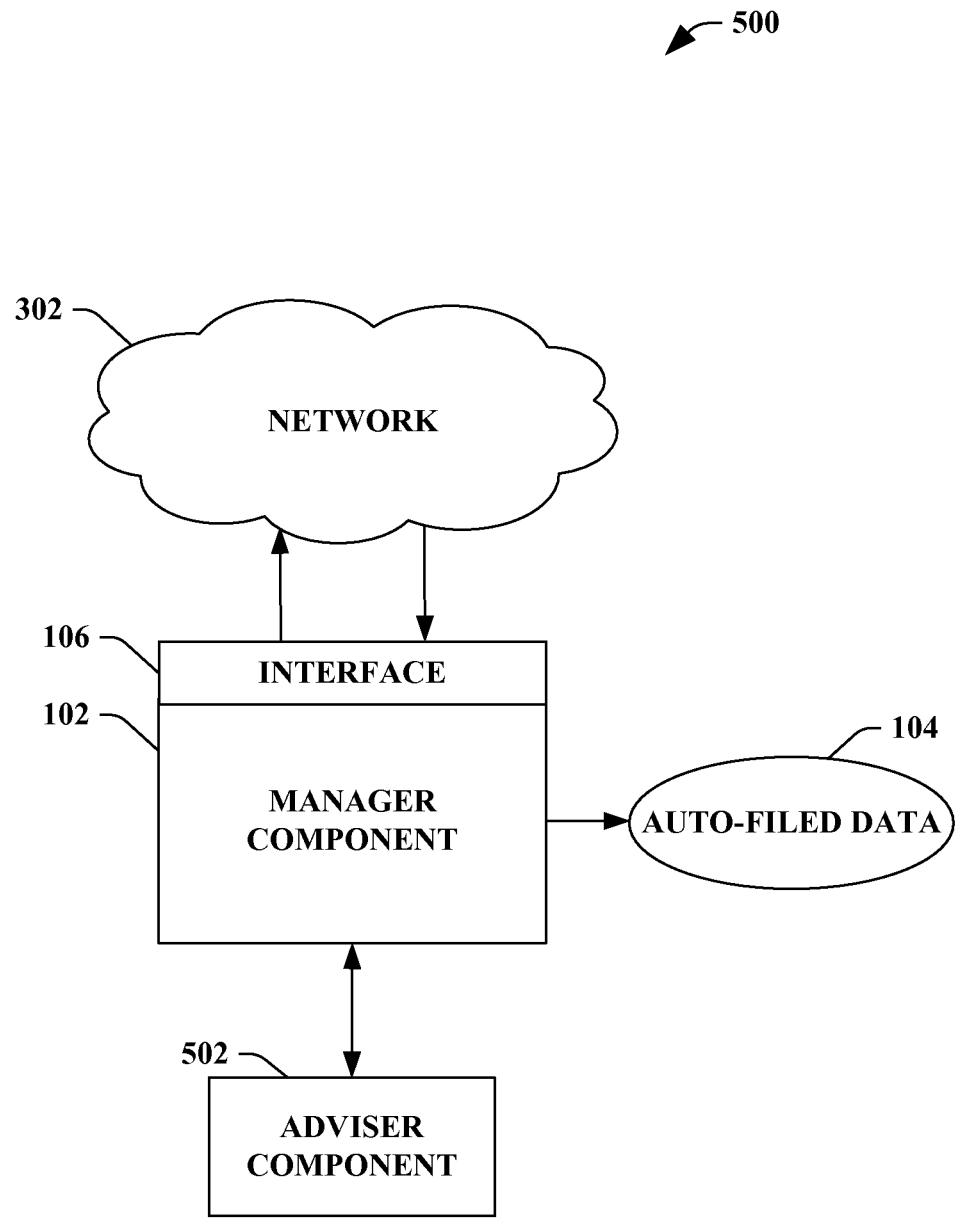
FIG. 5 illustrates a block diagram of exemplary system that facilitates enhancing automatic paperless sorting with suggested filing locations/categories.

FIG. 5 illustrates a system 500 that facilies enhancing automatic paperless sorting with suggested filing locations/categories. The system 500 can include the manager component 102 that can automatically file or store data into a virtual file stack utilizing a metadata tag in order to optimize an office environment. The system 500 can include an adviser component 502 that can provide a portion of suggestive data for a document in accordance with filing and/or storing. In general, the suggestive data can relate to a virtual file stack location, a storage location within a structure, a reference name for the document, a tag for the document, etc. For instance, the adviser component 502 can dynamically provide suggestive data for a document upon discovery, wherein the suggestive data can be a portion of a graphic. In one specific example, the portion of graphic can be a virtual sticker that can display suggestive data for informative purposes or confirmation purposes.

For example, a document can be detected and evaluated in which the adviser component 502 can display suggestive data in accordance with potential filing and/or storing (based on static metadata, generated metadata, any combination thereof, etc.). The suggestive data can allow a user to approve or confirm the suggestions, wherein the user can further manually edit such suggestions. Thus, a file storage location can be suggested as well as a file reference name, wherein the user can confirm the storage location and manually edit or change the suggested file reference name. It is to be appreciated that any suitable suggestion related to the automatic filing or storing can be implemented by the adviser component 502 and the above example is not to be limiting on the subject innovation.

Figure 6:
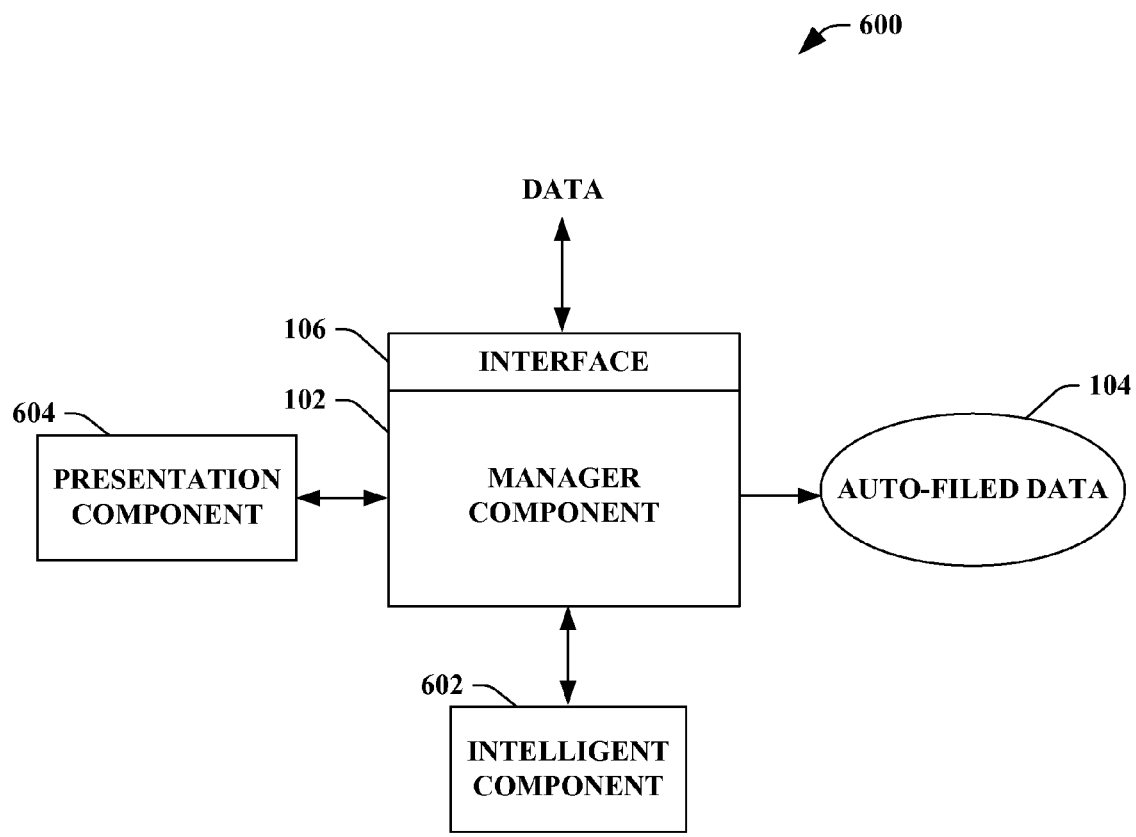
FIG. 6 illustrates a block diagram of an exemplary system that facilitates implementing a paperless environment with automatic document filing.

FIG. 6 illustrates a system 600 that employs intelligence to facilitate implementing a paperless environment with automatic document filing. The system 600 can include the manager component 102, auto-filed data 104, and the interface 106. It is to be appreciated that the manager component 102, auto-filed data 104, and the interface 106 can be substantially similar to respective components, interfaces, and data described in previous figures. The system 600 further includes an intelligent component 602. The intelligent component 602 can be utilized by the manager component 102 to facilitate automatically filing and/or storing data related to an office environment. For example, the intelligent component 602 can infer additional metadata for a document by evaluating static metadata related to a document, content of a document, content of data, purpose of a document, context of data, tag structures for data, conversion of data into schema, file locations within a structure, storage locations within a structure, virtual file stacks, naming conventions, suggestive data for filing, suggestive data for storing, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The manager component 102 can further utilize a presentation component 604 that provides various types of user interfaces to facilitate interaction between a user and any component coupled to the manager component 102. As depicted, the presentation component 604 is a separate entity that can be utilized with the manager component 102. However, it is to be appreciated that the presentation component 604 and/or similar view components can be incorporated into the manager component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the manager component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
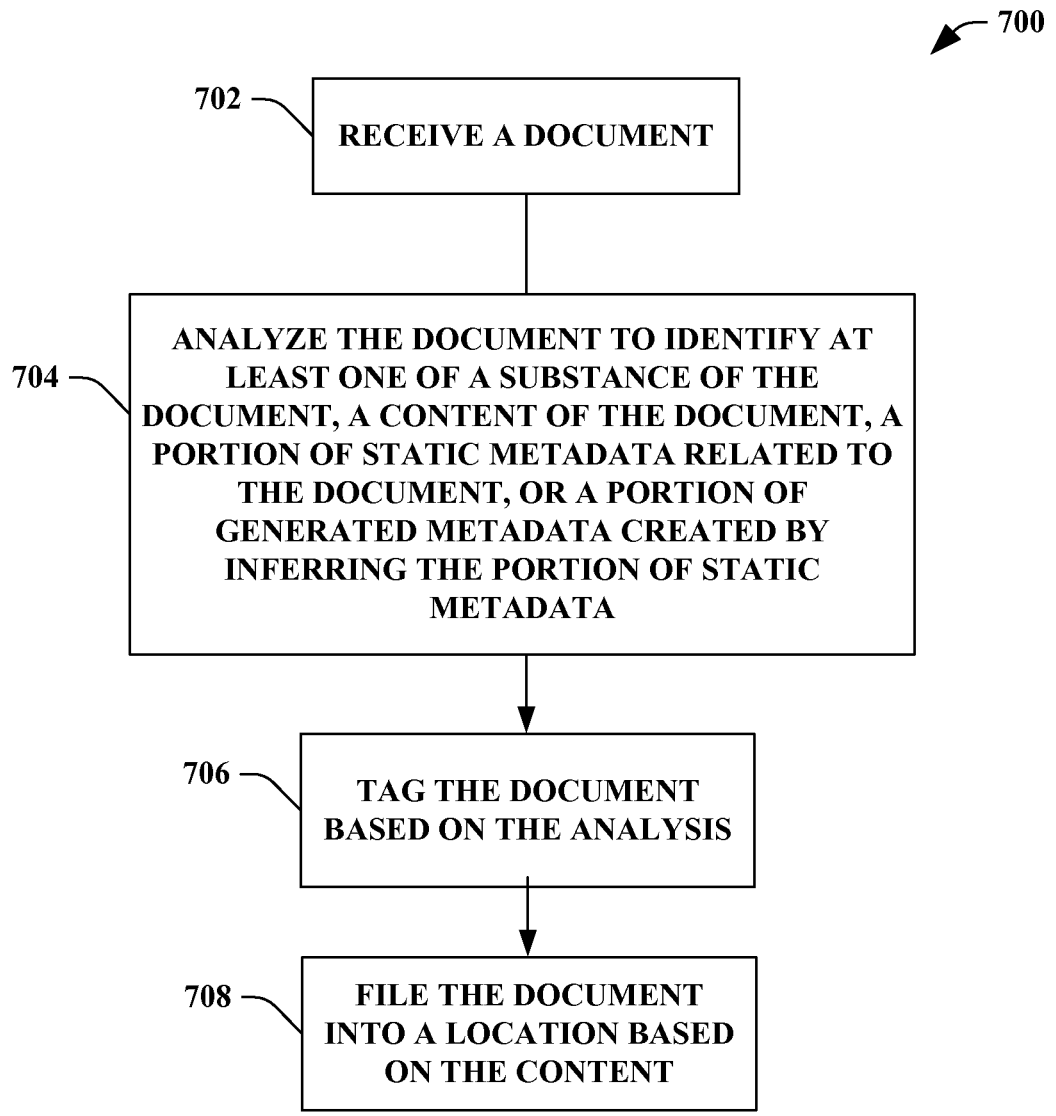
FIG. 7 illustrates an exemplary methodology for automatically organizing electronic documents associated with an office network.
Figure 8:
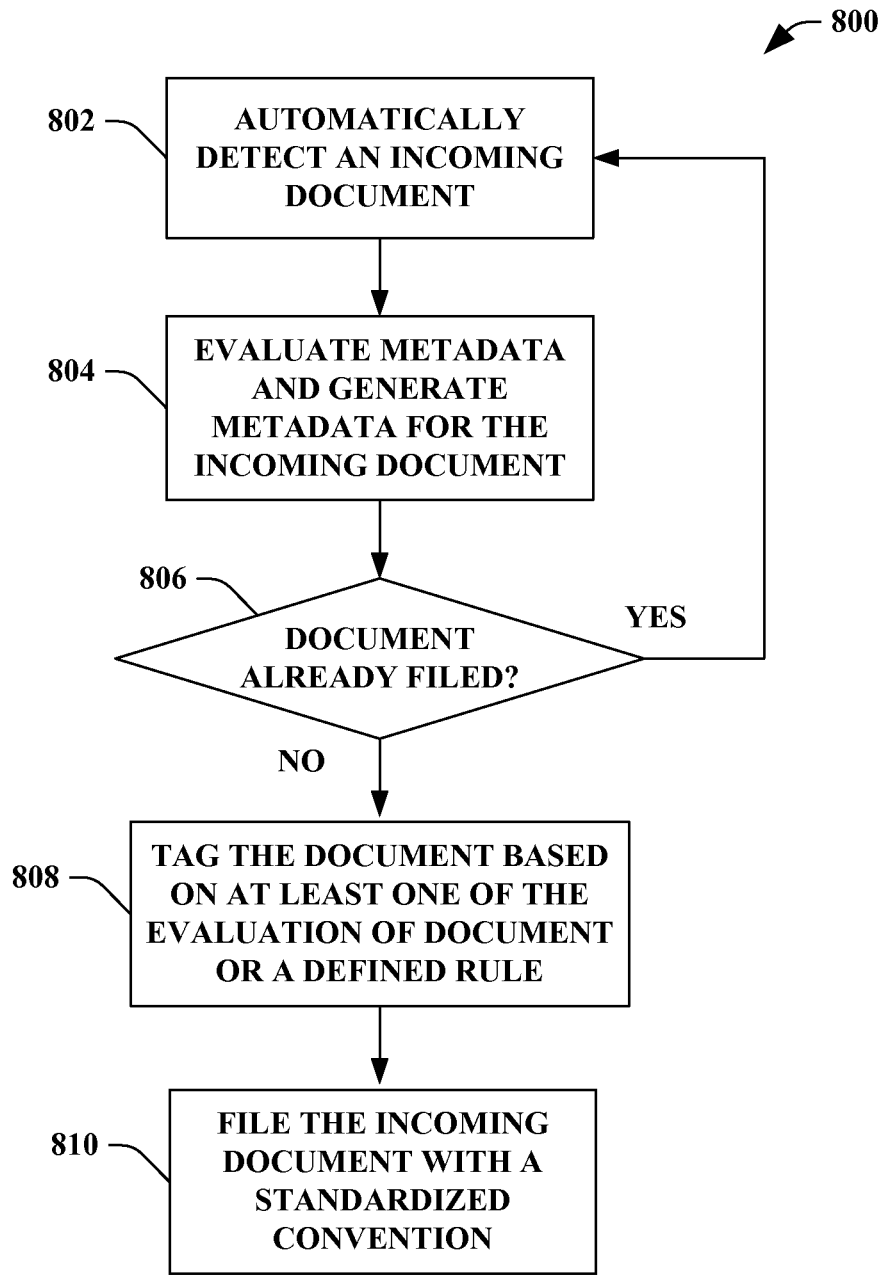
FIG. 8 illustrates an exemplary methodology that facilitates uniformly managing and filing incoming documents based on content.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates automatically organizing electronic documents associated with an office network. At reference numeral 702, a document can be received. For example, the document can be any suitable electronic document (regardless of file type or format) related to an office environment such as, but is not limited to being, an attachment, an email, a word processor document, a presentation document, a scanned document, a fax, a spreadsheet, a drawing, a figure, a graphic, a portion of audio, a portion of text, a portion of a graphic, a portion of video, a portable document format (PDF), etc. For example, a document can be received via a scanning device that can scan a physical piece of paper to create an electronic copy.

At reference numeral 704, the document can be analyzed to identify at least one of a substance of the document, a content of the document, a portion of static metadata related to the document, or a portion of generated metadata created by inferring the portion of static metadata. Static metadata related to a document can be evaluated in order to generate additional metadata that can provide a context, content, type, or purpose of the document. In other words, the static metadata can be examined to infer additional metadata that further clarifies the documents content/context. Various intelligence or machine learning can be employed in order to dynamically evaluate a document to ascertain content or context of the document. Thus, an email can be evaluated in order to determine the email relates to particular subject, topic, category, etc. At reference numeral 706, the document can be tagged based on the identified content. For instance, the tag can be metadata, a hypertext markup language (HTML) tag, a keyword, etc. In general, the tag can describe and/or identify a document.

At reference numeral 708, the document can be filed into a location based on the analysis. The document can be filed or stored into a structure associated with an office environment, wherein the structure can be a schema, a data structure, a file structure, a file folder directory, etc. It is to be appreciated and understood that the structure can be dynamically created, user-defined, pre-existing, etc. In another example, the document can be stored into a virtual file stack that can include documents with substantially similar content.

FIG. 8 illustrates a method 800 for uniformly managing and filing incoming documents based on content. At reference numeral 802, an incoming document can be automatically detected. The incoming document can be targeted for a network associated with an office environment. For instance, the incoming document can be received or detected via email, fax, scanning/copying device, a download, a network, the Internet, etc. For example, an email with a document attachment targeted for an employee in an office environment can be automatically detected. At reference numeral 804, metadata for the incoming document can be evaluated and additional metadata can be evaluated. Machine learning, inference techniques, intelligence, and the like can be utilized to generate additional metadata based on the static metadata and/or ascertain content, purpose, context, etc. of the incoming document, wherein various aspects/metadata of the document can be examined (e.g., date, author, origin, source, device source, location, title, name of author, type of document, physical origin, language of the document, size of document, information within the document, name of the file, amount of reviewers of the document, amount of authors, amount of people that contributed, order of modification of the document, and/or any other suitable data statically related to the document etc.).

At reference numeral 806, a decision is made whether the document has been already filed based on the evaluated content or context of such document. If the document has been already filed (e.g., YES), the method 800 can return to reference numeral 802 to continue automatic detection of incoming documents. If the document has not been already filed (e.g., NO), the method 800 can continue to reference numeral 808. At reference numeral 808, the document can be tagged based on at least one of the evaluation of the document or a user-defined rule. For instance, a user may edit automatic filing or storing options with a defined rule that stores or files a document regardless of content identified.

At reference numeral 810, the incoming document can be filed with a standardized convention. For instance, the standardized convention can relate to naming the document, location of the document, a virtual file stack name, a name reference related to a structure in which the document is stored, etc. By employing the standardized conventions, the documents automatically filed and stored can be easily accessed, queried, etc in an efficient manner.

Figure 9:
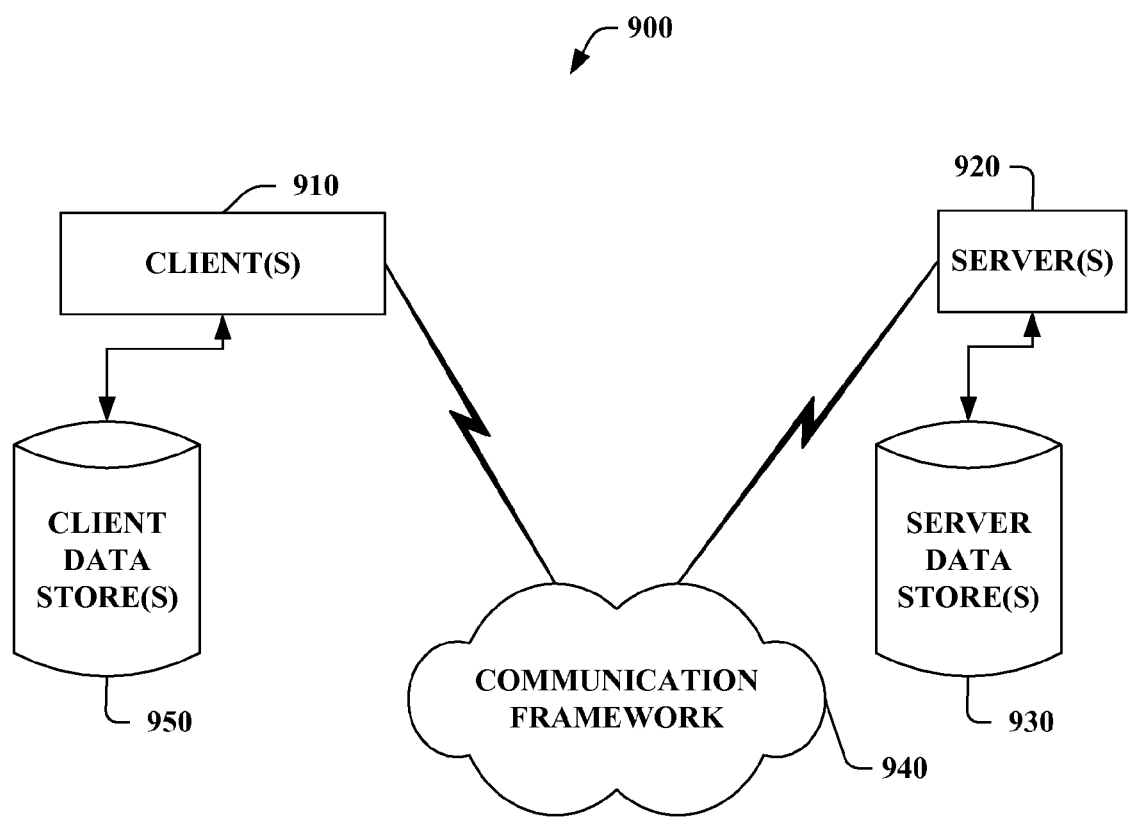
FIG. 9 illustrates an exemplary networking environment, wherein the novel aspects of the claimed subject matter can be employed.
Figure 10:
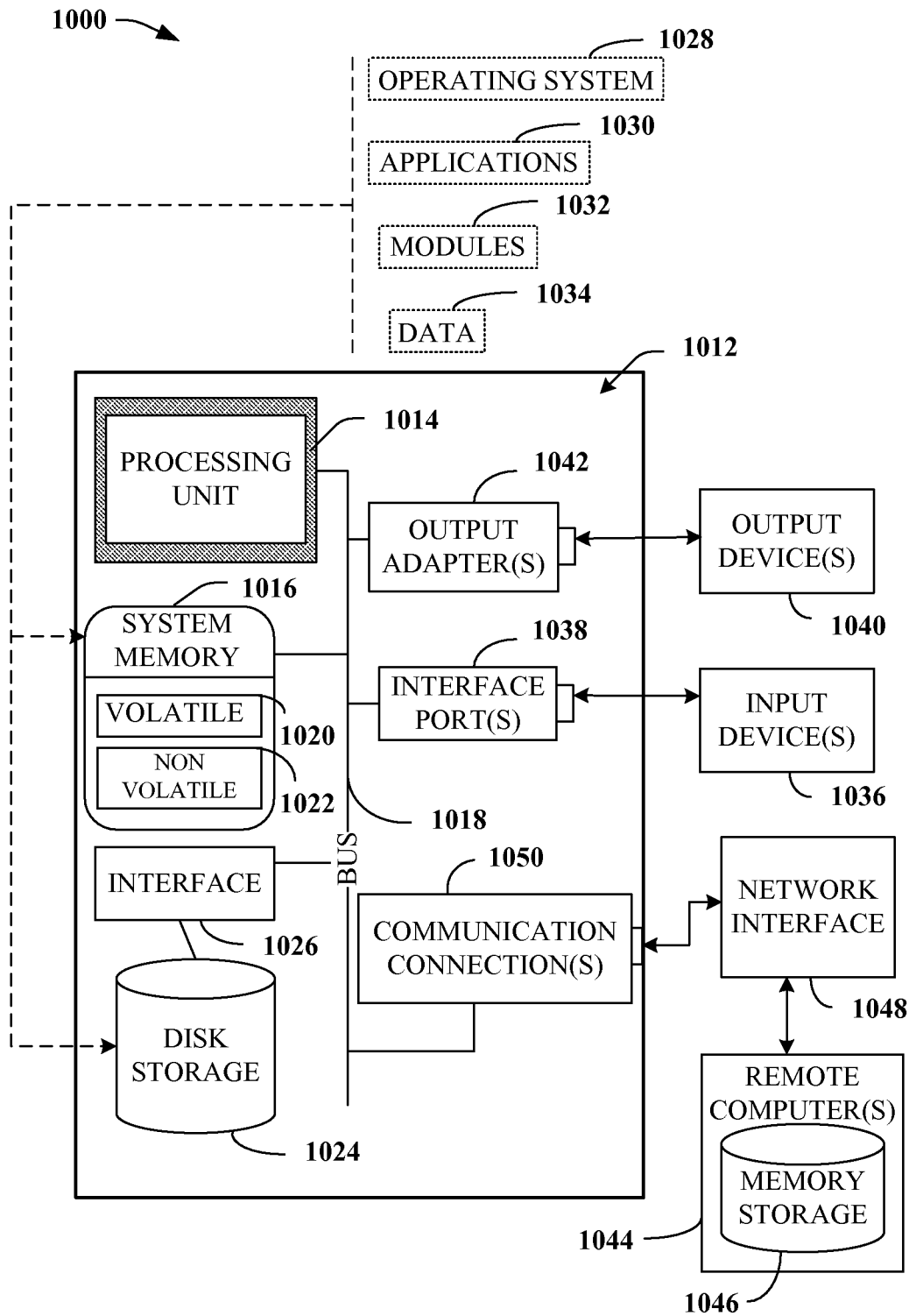
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a manager component that automatically files and stores an electronic document based on metadata (e.g., static, additional metadata created based on static metadata, etc.), as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computer-readable device having processor-executable instructions that, when executed by a processor, perform a method facilitating organization of electronic data, comprising:
    an interface component that receives a document;
    a manager component that automatically files the document into a location within a structure based at least in part upon a portion of static metadata associated with the document and a portion of metadata dynamically generated from an inference related to at least one of the portion of static metadata associated with the document or a content associated with the document; and an adviser component that (a) generates a portion of suggestive data to guide in automatic filing of the document, the portion of suggestive data relating to a virtual file stack location, (b) provides the suggestive data relating to the virtual file stack location in the form of a virtual sticker for the document upon discovery, and (c) displays the suggestive data relating to the virtual file stack location for at least one of acknowledgement or approval; and a log component that (a) tracks one or more filing details comprising a time, a location, a content, and a context of the document and (b) automatically stores the one or more filing details.

2. The computer-readable device of claim 1, the document is at least one of an attachment, an email, a word processor document, a presentation document, a scanned document, a fax, a spreadsheet, a drawing, a figure, a graphic, a portion of audio, a portion of text, a portion of a graphic, a portion of video, or a portable document format (PDF).

3. The computer-readable device of claim 1, the structure is at least one of an existing data structure, a network, a hard drive, a file storage system, a file folder directory structure, a data hierarchical structure, a schema, a data structure, a file structure, or a file folder directory system.

4. The computer-readable device of claim 1, further comprising an intelligent component that employs at least one of a support vector machine, a neural network, an expert system, a Bayesian belief network, fuzzy logic, a data fusion engine, or machine learning to infer at least one of the portion of static metadata, the content of the document, or the portion of metadata dynamically generated for automatic filing into the structure.

5. The computer-readable device of claim 1, the manager component creates a virtual file stack that includes two or more documents with related static metadata, content, and generated metadata independent of file type.

6. The computer-readable device of claim 1, the manager component provides at least one of the following:
the document is dynamically identified and filed upon detection of such document not being previously filed; or
an entity is notified of the document based on being relevant to such entity, the relevancy is determined by the inference.

7. The computer-readable device of claim 1, wherein the ascertaining the content or context of the document comprises at least one of a portion of content, the portion of static metadata, the content of the document, or the portion of generated metadata, the evaluation component examines at least one of a source that transmitted the document, a target of the document, a substance of the document, metadata related to the document, a property of the document, a received file type, a received file name, a document date, an author of the document, an origin of the document, a device that produced the document, a location associated with an origin of the document, a document title, a name of an author, a type of document, a physical origin of the document, a size of the document, a portion of information within the document, a language associated with the document, a name of a file extension, a file name for the document, an amount of reviewers for the document, an amount of authors, an amount of people that contributed to the document, or an order of modification to the document.

8. The computer-readable device of claim 1, further comprising a tag component that appends the document with the tag for identification, the tag describes the document based on at least one of the content of the document, the portion of static metadata, or the portion of generated metadata, and is at least one of a portion of metadata, a hypertext markup language (HTML) tag, or a keyword.

9. The computer-readable device of claim 1, further comprising a uniform component that employs a standardized naming convention in connection with at least one of a file name, a virtual file stack name, a file type for specific content, the location, or a name related to a portion of the structure into documents are filed.

10. The computer-readable device of claim 1, further comprising a search component that enables querying of at least one of the document, the structure, the location, a file name, a file type, a virtual file stack, a content ascertained with a document, a source that transmitted the document, a target that received the document, the portion of static metadata related to the document, the content of the document or the portion of generated metadata related to the document.

11. The computer-readable device of claim 1, further comprising a network that receives the document from a source, the network is related to an office environment.

12. The computer-readable device of claim 11, the source is a fax, an email, a scanning device, an application, a server, a web site, the Internet, or a disparate network.

13. A computer-readable device having processor-executable instructions that, when executed by a processor, perform a method facilitating organization of electronic data comprising:
receiving a document;
analyzing the document to identify at least one of a substance of the document, a content of the document, a portion of static metadata related to the document, or a portion of generated metadata created by evaluating a content of the document and the portion of static metadata related to the document;
generating a portion of suggestive data that relates to automatically filing the document, wherein the suggestive data relates to a virtual stack location;
displaying the suggestive data that relates to the virtual stack location as a virtual sticker upon at least one of the detection of the document or the receipt of the document;
tagging the document based on the analysis;
filing the document into a location within a schema based at least in part on the tag and the suggestive data that relates to the virtual stack location; and
logging one or more filing details comprising a time, a location, a content, and a context of the document; and
automatically storing the one or more filing details.

14. The computer-readable device of claim 13, further comprising:
automatically detecting an incoming document targeted for an office networked environment; and
ascertaining whether the incoming document has been previously filed.

15. The computer-readable device of claim 13, further comprising filing the document with a standardized convention.

16. A computing device comprising:
a processor; and
a memory coupled to the processor, the memory comprising computer-program instructions executable by the processor for:
an interface component that receives a document;
a manager component that automatically files the document into a location within a structure based at least in part upon a portion of static metadata associated with the document and a portion of metadata dynamically generated from an inference related to at least one of the portion of static metadata associated with the document or a content associated with the document; and an intelligent component, utilized by the manager component, to employ at least one of a support vector machine, a neural network, an expert system, a Bayesian belief network, fuzzy logic, a data fusion engine, or machine learning to:

infer at least one of the portion of static metadata, the content of the document, or the portion of metadata dynamically generated for automatic filing into the structure; and infer one or more states of the system to generate a probability distribution over the one or more states comprising states of interest based on a consideration of data and events resulting in the construction of one or more new events from a set of observed events and stored event data.

\* \* \* \* \*